United States Patent [19]

Tower et al.

[11] Patent Number: 4,769,209

[45] Date of Patent: Sep. 6, 1988

[54] COMPACT SMALL PRESSURIZED WATER NUCLEAR POWER PLANT

[75] Inventors: Stephen N. Tower, Washington Township, Westmoreland County; Luciano Veronesi, O'Hara Township, Allegheny County; Charles F. Currey, Wilkins Township, Allegheny County, all of Pa.

[73] Assignee: Westinghouse Electric Corp., Pittsburgh, Pa.

[21] Appl. No.: 817,702

[22] Filed: Jan. 10, 1986

[51] Int. Cl.[4] .......................... G21C 19/28; F22B 1/02
[52] U.S. Cl. ..................................... 376/402; 122/34; 165/139; 165/158
[58] Field of Search ............... 376/179, 402, 391, 406; 165/72, 75, 139, 158, 176; 122/34

[56] References Cited

U.S. PATENT DOCUMENTS

| | | | |
|---|---|---|---|
| 2,800,307 | 7/1957 | Putney | 165/139 |
| 2,812,164 | 11/1957 | Thompson | 165/139 |
| 3,235,463 | 2/1966 | Sankovich | 376/179 |
| 3,298,358 | 1/1967 | Alden, Jr. | 122/34 |
| 3,438,357 | 4/1969 | Weber | 376/406 |
| 3,814,178 | 6/1974 | Parussel | 165/158 |
| 3,906,905 | 9/1975 | Andrieu et al. | 122/34 |
| 4,039,377 | 8/1977 | Andrieu et al. | 376/402 |
| 4,047,562 | 9/1977 | Weber | 165/72 |
| 4,094,737 | 6/1978 | Greischel et al. | 376/402 |
| 4,223,722 | 9/1980 | Shade, Jr. | 165/139 |
| 4,236,970 | 12/1980 | Harand et al. | 165/158 |

FOREIGN PATENT DOCUMENTS 2337409  12/1975  France .

Primary Examiner—Deborah L. Kyle
Assistant Examiner—Richard L. Klein
Attorney, Agent, or Firm—D. C. Abeles

[57] ABSTRACT

A nuclear reactor steam generating plant having a pressurized water reactor with a single discharge line to a steam generator, with the primary coolant passing through the steam generator tubes divided into two streams in the channel head outlet section that is divided into two subsections. Discharge nozzles on the outlet subsections direct the streams of coolant to hermetically sealed pumps directly attached to the discharge nozzles, with the pumps directing the cooled primary coolant back to the reactor vessel. A single removable closure is provided for access to both subsections of the outlet section of the channel head, with a removable portion provided on the divider plate that forms the subsections.

8 Claims, 4 Drawing Sheets

COMPACT SMALL PRESSURIZED WATER NUCLEAR POWER PLANT

BACKGROUND OF THE INVENTION

The high cost, long lead time, and difficult licensing procedures associated with large nuclear power plants in this decade, combined with low system load growth, has led to renewed interest in smaller nuclear power plants. Smaller plants more closely fit the growth pattern and require less total capital to get the required generating capacity on the line.

Smaller plants must, however, achieve lower cost per kilowatt and be more reliable than heretofore provided, to be accepted. Simply stated, the smaller plant must be extremely reliable; be demonstrably, convincingly safe; have unit capital cost (cost/MWe) only slightly higher than large nuclear plants; and have a low development cost. These requirements, when applied to the design of a small pressurized water reactor mean that the reactor coolant system should, among other features, possess the characteristics of simplicity, compactness, accessibility for inspectors and maintenance, capability of employing hermetically sealed pumps, capability of low power on natural circulation, no core uncovery curing a small loss of coolant event, and make use of proven components.

It is an object of the present invention to provide a compact nuclear reactor steam generator that will be extremely reliable and safe, with a compact reactor coolant system using hermetically sealed pumps directly attached to the steam generator channel head.

SUMMARY OF THE INVENTION

A nuclear reactor steam generating plant has a pressurized water reactor and a single discharge line to a steam generator, the discharge line having a pressurizer thereon, being connected to an inlet nozzle on the channel head of the steam generator. The steam generator channel head is divided into an inlet section and an outlet section by a divider plate, with U-shaped tubes communicating between the two sections, and the outlet section is subdivided into two subsections by a laterally extending extension on the divider plate. Each outlet subsection has thereon an outlet nozzle and a hermetically sealed pump is attached to each discharge nozzle to return cooled primary coolant back to the pressurized water reactor through respective return lines. The pumps are vertically attached to the channel head outlet subsection nozzles and are preferably canned motor pumps having the suction nozzle thereof attached to the discharge nozzle, with a side discharge feeding to the return line.

Access to each of the outlet subsections of the channel head is achieved through a single closure removable means which is positioned adjacent a removable portion on the laterally extending extension of the divider plate.

DETAILED DESCRIPTION OF THE PREFERRED EMBODIMENT

In conventional steam generators for use with pressurized water reactors, the steam generator comprises a cylindrical body portion that is fitted at its bottom with a hemispherical shell. A transverse horizontal steel plate or tubesheet, at the lower end of the cylindrical shell divides the steam generator into a primary side below the tubesheet and a secondary side above the tubesheet. The primary side, also referred to as the channel head is divided in half by a vertical divider plate into an inlet section and an outlet section. The tubesheet has an array of holes through which U-shaped heat transfer tubes are inserted, so that one end of each tube communicates with the inlet section of the channel head and the other end communicates with the outlet section. In operation, primary coolant discharged from the reactor enters the inlet section of the channel head, circulates through the U-shaped tubes and exits the outlet section of the channel head for return to the reactor. Recirculation pumps to return the primary coolant from the outlet section of the channel head to the reactor are normally positioned in the return line to the reactor. Heat transfer from the primary coolant through the U-shaped tubes heats the secondary coolant in the secondary side of the steam generator to produce steam for electrical power production.

Figure 4:
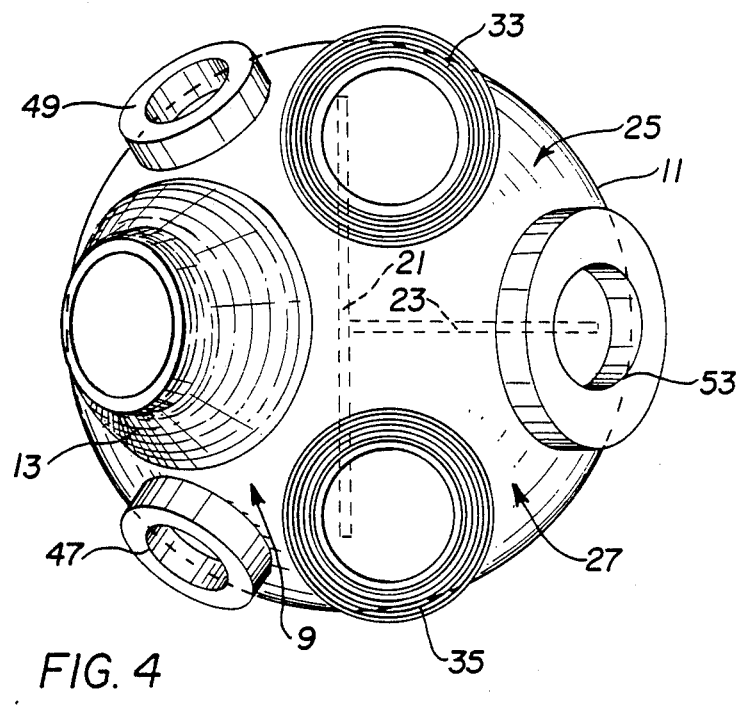
FIG. 4 is a bottom view of the channel head of the steam generator illustrating the location of the inlet nozzle, two outlet nozzles and removable closure means.
Figure 5:
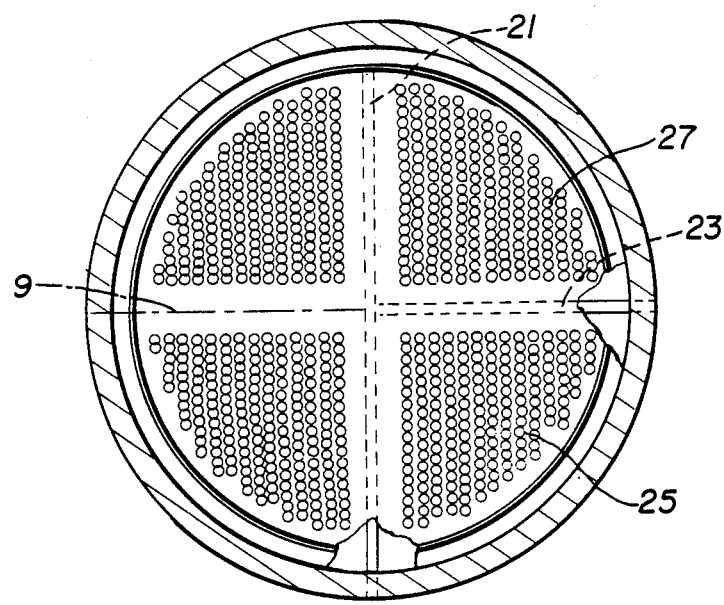
FIG. 5 is a plan view, with portions cut away, taken above the tube sheet, illustrating the division of the channel head into an inlet section and two outlet subsections by the divider plate.
Figure 6:
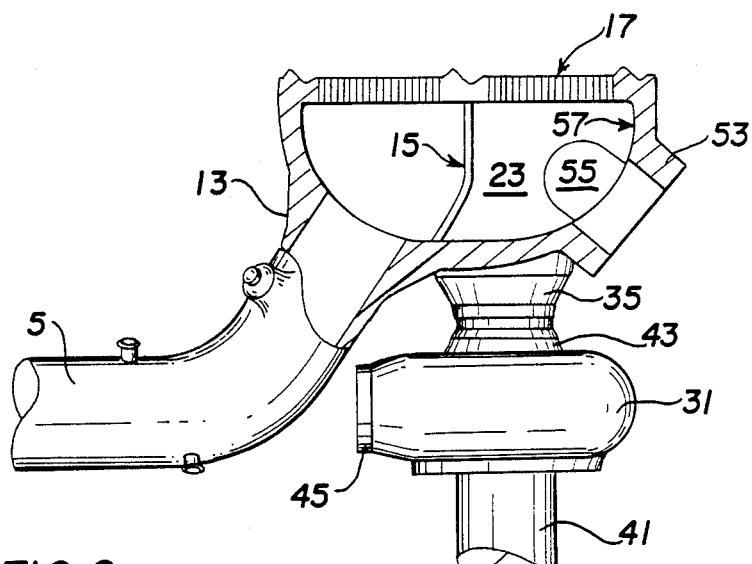
FIG. 6 is a view, partly in cross-section showing attachment of a canned motor pump directly to an outlet nozzle of the channel head, and the side discharge therefrom.

As illustrated in FIGS. 1 through 6, a pressurized water nuclear reactor plant 1, according to the present invention, comprises a pressurized water reactor having a pressure vessel 3 containing a core and means for flow of primary coolant therethrough to heat the same, and a single discharge line 5 to discharge hot primary coolant therefrom to a steam generator 7. A pressurizer 8, as is conventional (not shown), is connected to the discharge line 5 intermediate the pressure vessel 3 and steam generator 7. The line 5 feeds hot primary coolant to the inlet section 9 of the channel head 11 of steam generator 7, and is attached to an inlet nozzle 13 thereon. A divider plate 15 in the channel head 11 below the tubesheet 17 divides the channel head into an inlet section 9 and an outlet section 19. The divider plate 15 is of a T-shaped design and has plate 21 with a perpendicular laterally extending extension 23 extending therefrom across the outlet section 19 of the channel head 11 to divide the outlet section into two subsections 25 and 27 (FIGS. 4 and 5).

The subsections 25 and 27 of the steam generator channel head each have directly secured thereto a hermetically sealed pump, 29 and 31 respectively, such reactor coolant pumps being of a canned motor or wet winding type. Such hermetically sealed pumps have superior reliability and simpler operational requirements. These two pumps 29 and 31 are mounted vertically to the two steam generator channel head subsections 25 and 27 with their suction nozzles welded directly to two steam generator subsection outlet nozzles 33 and 35 located on the bottom of the channel head. The dead weight of each pump is supported by the steam generator eliminating the need for a separate set of supports for each pump. The pumps 29 and 31 feed coolant directly through return lines 37 and 39 back to the reactor 3. Reactor safety is enhanced by elimination of loop seal piping between the steam generator channel head and pumps, as are required in conventional designs. This configuration virtually eliminates the possibility of uncovering the core in the event of a small cold leg loss of coolant event. Also, such a configuration simplifies the loop piping, and eliminates pipe supports and restraints, thereby reducing both capital costs and operating costs.

The T-shaped design of the divider plate 15, with plate 21 and laterally perpendicular extensions 23 effectively (hydraulically) separates the steam generator tube bundle into two parts by dividing the cold leg portions so that one-half of the tubes provide its half of the total flow to each channel head subsections 25 and 27 and its respective nozzle 33 and 35 and pump means 29 and 31. This construction permits the reactor coolant system to operate at approximately fifty percent power with only one of the two pumps operating, without the addition of costly checks or isolation valves to prevent core bypassing reverse flow through the inactive pump. Some reverse bypass flow does occur in this "n-1" pump case, but the combined resistance of the reverse flow path through the inactive pump and one-half of the steam generator tube bundle is sufficient so that only a small percentage of the coolant bypasses the core. By removing the check valve as a component in the reactor coolant system, the potential for check valve maloperation is eliminated, thus increasing the reliability of the reactor coolant system.

A hermetically sealed, canned motor pump, such as a model M-1000 pump of Westinghouse Electric Corporation is preferred for use in the present invention. These pumps are single speed, vertical shaft, centrifugal canned motor units driven by water-cooled, three-phase induction motors. The pumps are mounted with the motor 41 below the casing. The suction nozzle 43 (at the top) is connected to the steam generator outlet nozzles 33 or 35 and the discharge nozzle 45 is on the side of the casing. The pump bearings are cooled and lubricated by the pumped fluid. A small fraction of the flow is circulated through a cooling coil outside the pump's pressure housing before entering the bearing region. Heat is removed from the unit by circulation of component coolant water through a cooling jacket outside the coil.

Access to the channel head 11 is provided through three bolted and gasketed closures. A pair of removable closures, 47 and 49 are provided in the wall 51 of channel head inlet section 9, one on each side of the inlet nozzle 13. A single removable closure 53 may be used to provide access to both of the subsections 25 and 27 of the outlet section 19 of the channel head by providing a removable portion 55 in the laterally extending extension 23, the closure situated at the connection of laterally extending extension 23 with the wall 57 of the channel head 11. The removable portion 55 and the closures 47, 59 and 53 are of sufficient size to enable use of remote service equipment. The use of the single closure 53 in the outlet section 19 of the channel head 11 is enabled by the provision of the removable portion 55 on laterally extending perpendicular extension 23. Thus, the need for two such closures, one for each subsection 25 and 27 is eliminated.

The return lines 37 and 39 are short, compared to conventional design, and employ long radius bent pipe. Thus, system pressure drop is lowered, pump power is reduced, and the cost of the piping itself is reduced by virtue of the shorter runs and elimination of pipe welds. This arrangement also contributes to increasing reactor coolant system natural circulation capabilities and the ability of the plant to operate at part load (20 to 25% power) without pump operation.

Because of the close-coupled steam generator and pump arrangement, the reactor coolant system is compact. As a result, other components of the system are smaller and less expensive. Primary system water is reduced with the effect of reducing containment costs.

Figure 7:
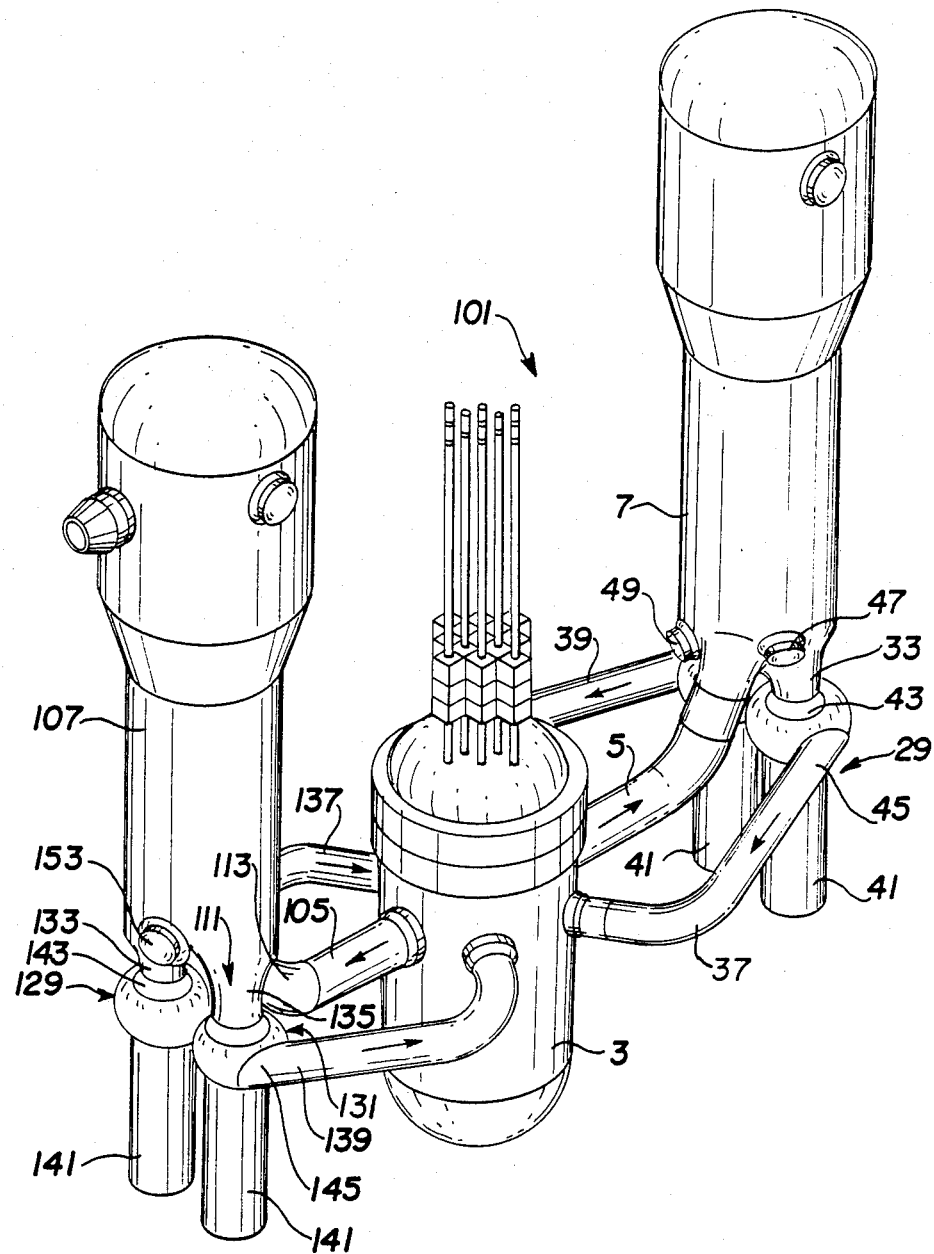
FIG. 7 is a perspective view of another embodiment of the nuclear reactor steam generation plant of the present invention wherein two steam generators are provided in conjunction with a single pressurized water reactor.

The above-described nuclear power plant which can be referred to as a "one and a half loop" plant is applicable to plant sizes ranging from 1 MWe to 300 MWe with currently available components. As illustrated in FIG. 7, the potential size of the small plant may be doubled to a larger plant 101 (to 600 MWe) by adding a second discharge line 105, and steam generator 107. This second loop would have the same components as the initial loop (containing discharge line 5 and steam generator 7) as indicated by the channel head 111, inlet nozzle 113, pumps 129 and 131, outlet nozzles 133 and 135, return lines 137 and 139, pump motors 141, pump suction nozzles 143, pump discharge nozzles 145, closure 153 and the like.

In the nuclear reactor steam generating plant of the present invention, the single discharge line 5 serves as a thermal expansion strut positioning the steam generator away from the reactor vessel, while the return lines 37 and 39 have adequate flexibility to compensate for expansion differences between the hot discharge line and the cold return lines.

Figures 1, 2:
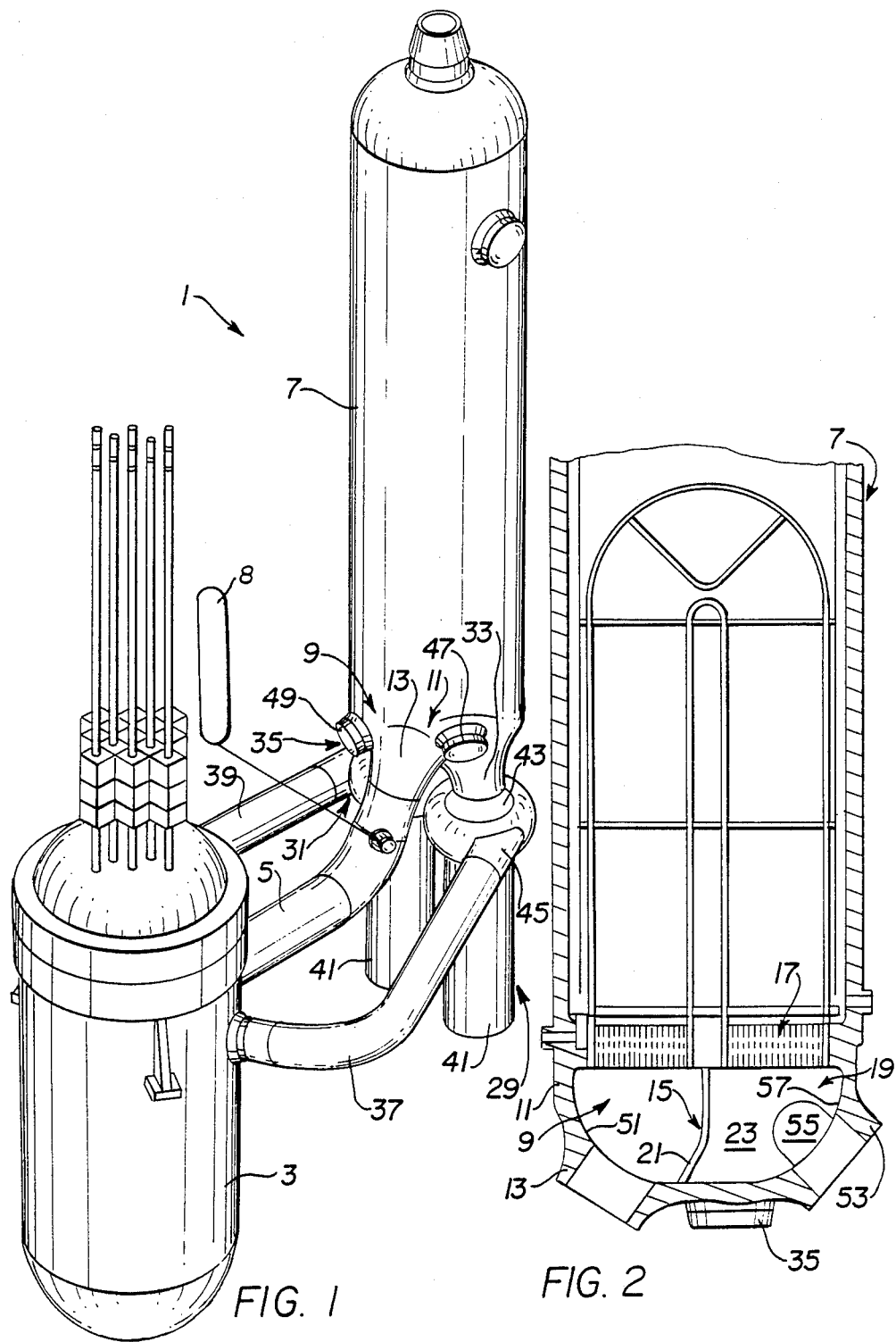
FIG. 1 is a perspective view of the nuclear reactor steam generating plant of the present invention.
FIG. 2 is a vertical cross-sectional view through the steam generator of the present plant showing the channel head and tube assembly, with portions removed for clarity.
Figure 3:
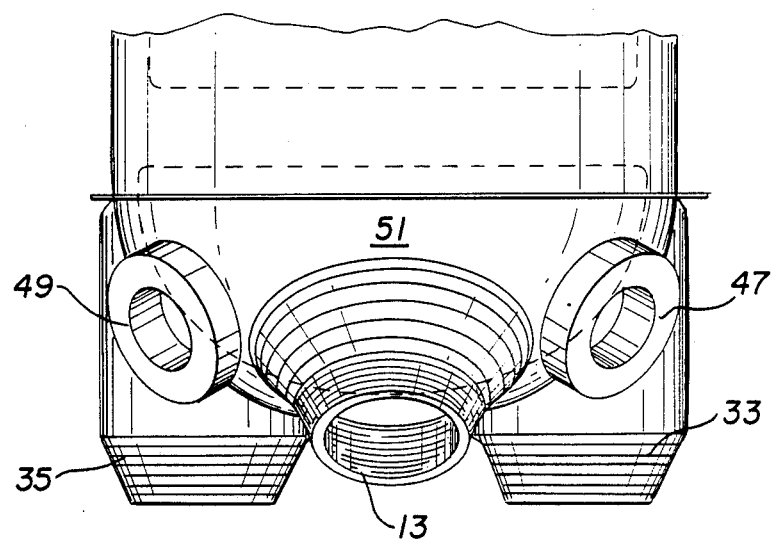
FIG. 3 is an elevational view of the channel head portion of the steam generator, looking towards the inlet nozzle.

In addition, the configuration, as illustrated in FIG. 1, with the nozzles all at the same elevation entirely above the core within the pressure vessel, enables elimination of loop seal traps below core level.

What is claimed is:

1. A nuclear reactor steam generating plant having a pressurized water reactor with means for discharging hot primary coolant therefrom to a steam generator, said means for discharging having a pressurizer unit connected thereto, wherein the hot primary coolant is directed to the steam generator and cooled in the steam generator by heat transfer through tubes to a secondary coolant, and the primary coolant is returned from a channel head of the steam generator to the pressurized water reactor through a return line, comprising:

a single discharge line to discharge primary coolant to the steam generator;

means provided in the steam generator to divide the cooled primary coolant into a pair of streams comprising a T-shaped divider plate in the channel head comprising a plate and a laterally extending extension, the plate of which divides the channel head into an inlet section and an outlet section and the laterally extending extension of which divides the outlet section into two subsections;

a pair of return lines, one of which returns one of the pair of streams of cooled primary coolant, and the other of which returns the other of the pair of streams of cooled primary coolant, from the steam generator back to the pressurized water reactor; and a pair of pump means, one for each said return line, in direct communication with the steam generator channel head, and secured to the bottom thereof by a pair of discharge nozzles on the channel head, with one of said pair of pump means directly secured to one of said pair of discharge nozzles and the other of said pair of pump means directly secured to the other of said pair of discharge nozzles, to direct cooled primary coolant to each of said pair of return lines.

2. A nuclear reactor steam generating plant as defined in claim 1 wherein a removable portion is provided in the laterally extending extension of said T-shaped divider at the connection thereof with the wall of the channel head.

3. A nuclear reactor steam generating plant as defined in claim 2 wherein a single removable closure is provided in the channel head wall situated at the connection of the laterally extending extension to said wall to provide access to the subsections of the outlet section of the channel head.

4. A nuclear reactor steam generating plant as defined in claim 3 wherein a pair of removable closures are provided in the channel head to provide access to the inlet section of the channel head, one of said pair being located on each side of an inlet nozzle to said channel head.

5. A nuclear reactor steam generating plant having a pressurized water reactor with means for discharging hot primary coolant therefrom to a steam generator, said means for discharging having a pressurizer unit connected thereto, wherein the hot primary coolant is directed to the steam generator and cooled in the steam generator by heat transfer through tubes to a secondary coolant, and the primary coolant is returned from a channel head of the steam generator to the pressurized water reactor through a return line, comprising:

a single discharge line to discharge primary coolant to the steam generator;

means provided in the steam generator to divide the cooled primary collant into a pair of streams, comprising a T-shaped divider plate in the channel head having a plate and a laterally extending extension, the plate of which divides the channel head into an inlet section and an outlet section and the laterally extending extension of which divides the outlet section into two subsections;

a pair of return lines, one of which returns one of the pair of streams of cooled primary coolant, and the other of which returns the other of the pair of streams of cooled primary coolant, from the steam generator back to the pressurized water reactor;

a pair of vertical discharge nozzles on the channel head of the steam generator, one for each of said subsections; and a pair of pump means, with one of said pair of pump means directly secured to one of said pair of discharge nozzles and the other of said pair of pump means directly secured to the other of said pair of discharge nozzles.

6. A nuclear reactor steam generating plant as defined in claims 5 wherein a removable portion is provided in the laterally extending extension of said T-shaped divider at the connection thereof with the wall of the channel head.

7. A nuclear reactor steam generating plant as defined in claim 6 wherein a single removable closure is provided in the channel head wall situated at the connection of the laterally extending extension to said wall to provide access to the subsections of the outlet section of the channel head.

8. A nuclear reactor steam generating plant as defined in claim 7 wherein said pump means comprises sealed, canned motor pumps vertically secured to the discharge nozzles of the channel head, each said pump having a suction nozzle, motor and side discharge nozzle, and the motor is below the suction nozzle and side discharge, and said suction nozzle is directly secured to the discharge nozzle of the channel head.

* * * * *